US012115556B2

(12) United States Patent
Rafferty

(10) Patent No.: US 12,115,556 B2
(45) Date of Patent: Oct. 15, 2024

(54) MOBILE AGGREGATE PROCESSING PLANT

(71) Applicant: Portafill International Limited, Omagh (GB)

(72) Inventor: Malachy James Rafferty, Omagh (GB)

(73) Assignee: PORTAFILL INTERNATIONAL LIMITED, Omagh (GB)

( * ) Notice: Subject to any disclaimer, the term of this patent is extended or adjusted under 35 U.S.C. 154(b) by 0 days.

(21) Appl. No.: 18/319,579

(22) Filed: May 18, 2023

(65) Prior Publication Data

US 2023/0405636 A1 Dec. 21, 2023

(30) Foreign Application Priority Data

May 23, 2022 (GB) .................................... 2207521

(51) Int. Cl.
*B07B 1/00* (2006.01)
*B02C 21/02* (2006.01)
(Continued)

(52) U.S. Cl.
CPC .............. *B07B 1/005* (2013.01); *B02C 21/02* (2013.01); *B02C 23/02* (2013.01); *B07B 13/16* (2013.01)

(58) Field of Classification Search
CPC ........... B07B 1/005; B07B 13/16; B07B 1/00; B07B 13/14; B07B 15/00; B02C 21/02;
(Continued)

(56) References Cited

U.S. PATENT DOCUMENTS 5,647,545 A * 7/1997 Conner .................. B02C 21/02 241/101.76
5,655,719 A * 8/1997 Getz ...................... B02C 21/02 241/34

(Continued)

FOREIGN PATENT DOCUMENTS

EP 2883624 A1 * 6/2015 .......... B02C 21/026
EP 3354357 A1 * 8/2018 .......... B02C 21/026
WO WO-2004085071 A1 * 10/2004 .......... B02C 21/026

OTHER PUBLICATIONS

Portafill 5000CT with Shredder "https://www.youtube.com/watch?v=ReSfzf_Z7aw" (Year: 2015).*

(Continued)

*Primary Examiner* — Gene O Crawford
*Assistant Examiner* — Muhammad Awais
(74) *Attorney, Agent, or Firm* — Faegre Drinker Biddle & Reath LLP

(57) ABSTRACT

A mobile aggregate processing plant for screening material including a chassis and a vibrating screen support frame, and a vibrating screen mounted on the support frame, wherein the vibrating screen has an infeed end and a discharge end, and able to provide at least one material discharge stream therethrough. A feed hopper has a discharge end able to feed a stream of feed material into or onto the vibrating screen. A shredding apparatus is moveable between at least a first in use position above the infeed end of the vibrating screen and/or next to the hopper discharge end, and a second transport position not above the infeed end of the vibrating screen and/or not next to the hopper discharge end.

17 Claims, 7 Drawing Sheets

(51) Int. Cl.
*B02C 23/02* (2006.01)
*B07B 13/16* (2006.01)

(58) Field of Classification Search
CPC ....... B02C 23/02; B02C 21/026; B02C 21/00; B02C 23/00
USPC ........................................... 209/233, 26, 421
See application file for complete search history.

(56) References Cited

U.S. PATENT DOCUMENTS

| | | | | |
|---|---|---|---|---|
| 6,186,338 | B1 * | 2/2001 | Douglas | B02C 21/02 209/244 |
| 9,895,696 | B2 * | 2/2018 | Hamilton | B02C 1/025 |
| 2006/0086850 | A1 * | 4/2006 | Cohen | B02C 13/31 241/189.1 |
| 2008/0041984 | A1 * | 2/2008 | Sauser | B65G 11/206 241/101.76 |
| 2009/0173671 | A1 * | 7/2009 | O'Keeffe | B07B 1/46 209/421 |
| 2010/0193619 | A1 * | 8/2010 | Robinson | B02C 21/026 241/245 |
| 2013/0168208 | A1 * | 7/2013 | Erkkila | B07B 1/005 198/618 |
| 2014/0158798 | A1 * | 6/2014 | Cohen | B02C 23/08 241/24.1 |
| 2014/0224906 | A1 * | 8/2014 | Dunn | B02C 21/026 209/241 |
| 2016/0184832 | A1 * | 6/2016 | Salminen | B02C 23/08 241/101.5 |
| 2016/0199850 | A1 * | 7/2016 | Salminen | B02C 21/02 241/24.1 |
| 2016/0279644 | A1 * | 9/2016 | Stemper | B02C 23/08 |
| 2017/0304842 | A1 * | 10/2017 | McDevitt | B02C 21/026 |
| 2019/0283083 | A1 | 9/2019 | Rafferty | |
| 2020/0384504 | A1 | 12/2020 | Rafferty | |
| 2021/0299674 | A1 * | 9/2021 | Narayanaswamy | B02C 21/02 |

OTHER PUBLICATIONS

Portafill MR5 Scalper with Shredder "https://www.youtube.com/watch?v=4su0sb_nVdE" (Year: 2021).*
Combined Search and Examination Report for GB2207521.2 dated Nov. 11, 2022, 7 pages.
Examination Report for GB2207521.2 dated Apr. 24, 2023, 3 pages.
https://www.youtube.com/watch?v=ReSfzf_Z7aw, Jul. 11, 2015.
Portafill 5000CT Technical Specification, 4 pages Oct. 2014.

* cited by examiner

FIG. 4
FIG. 4a
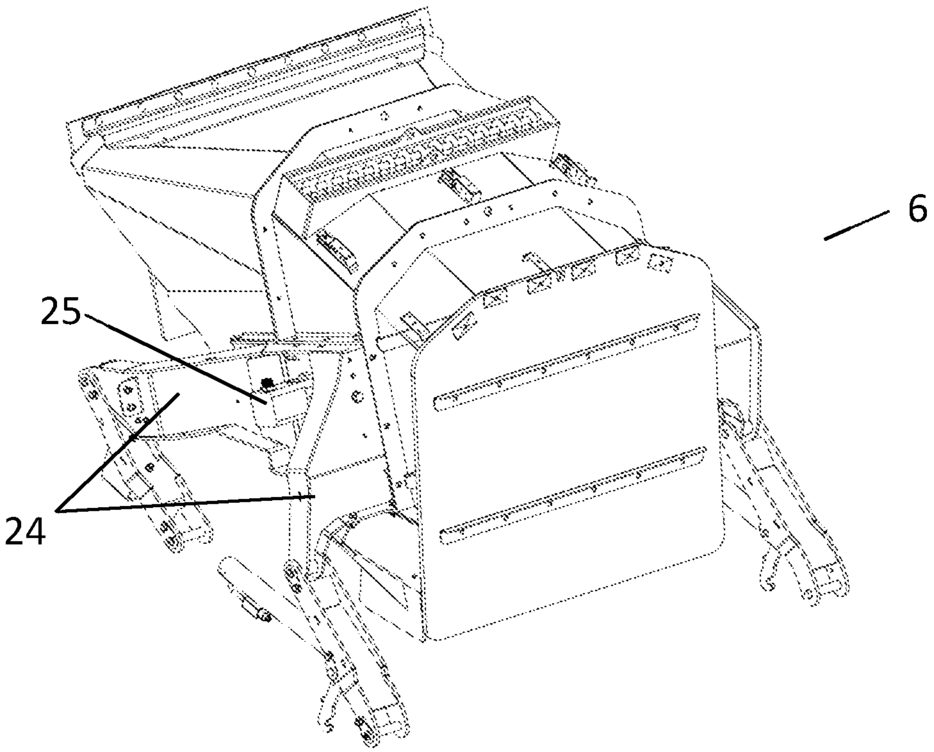
FIG. 4b
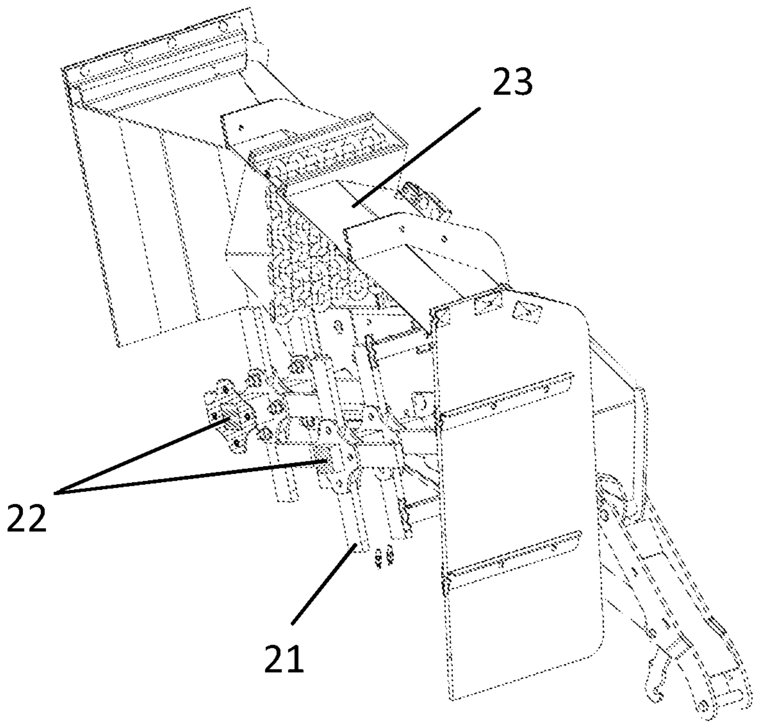

FIG. 5
FIG. 5a
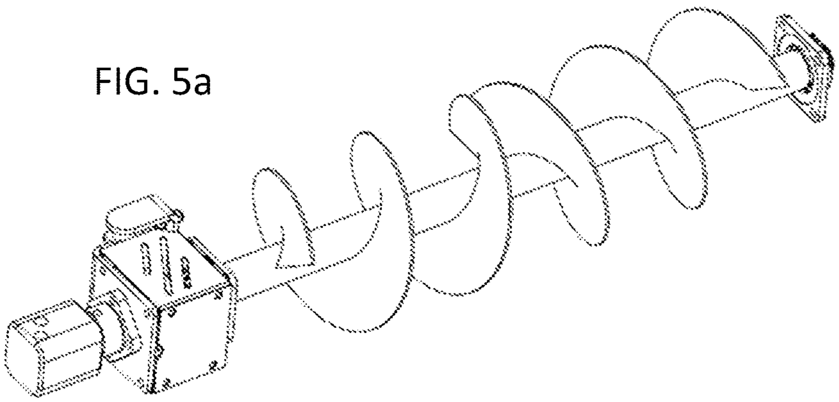
FIG. 5b
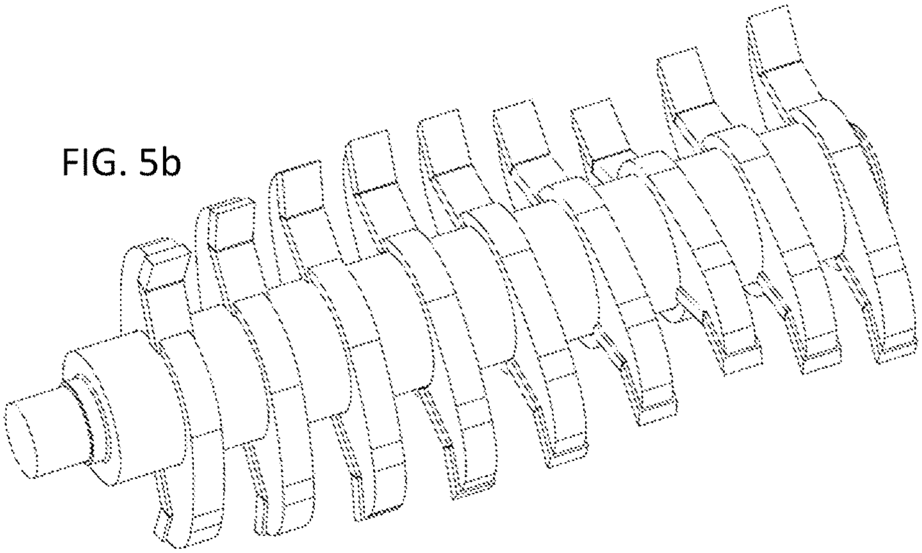
FIG. 5c
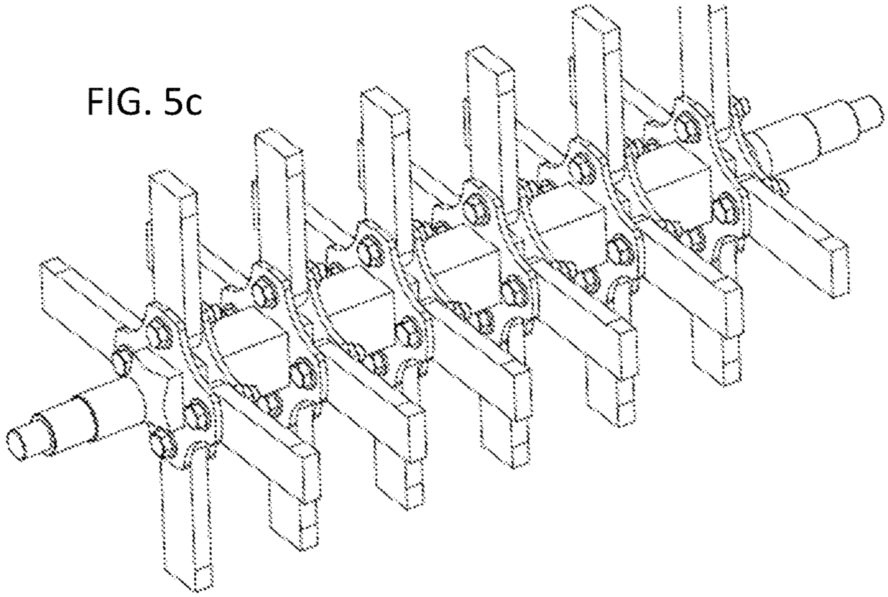

FIG. 6
FIG. 6a
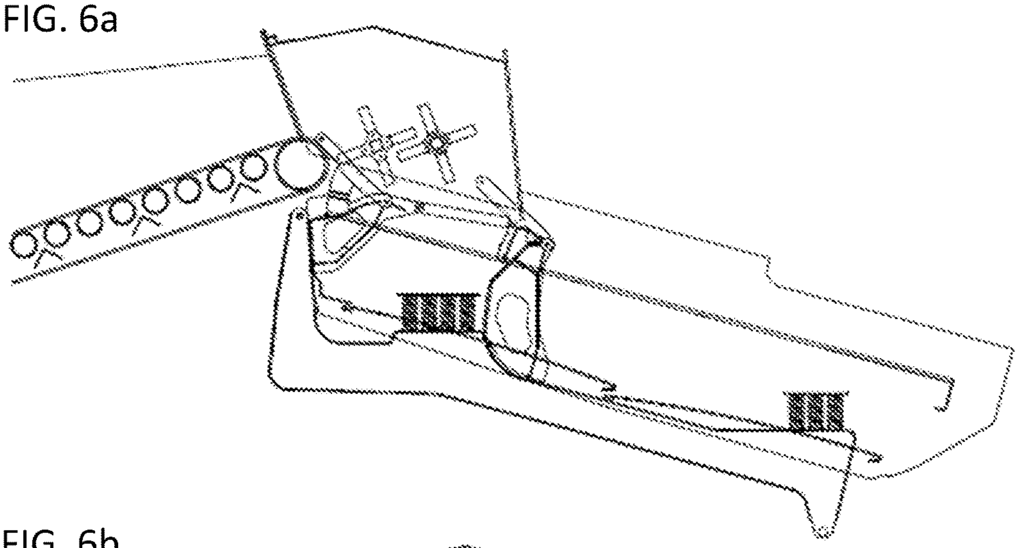
FIG. 6b
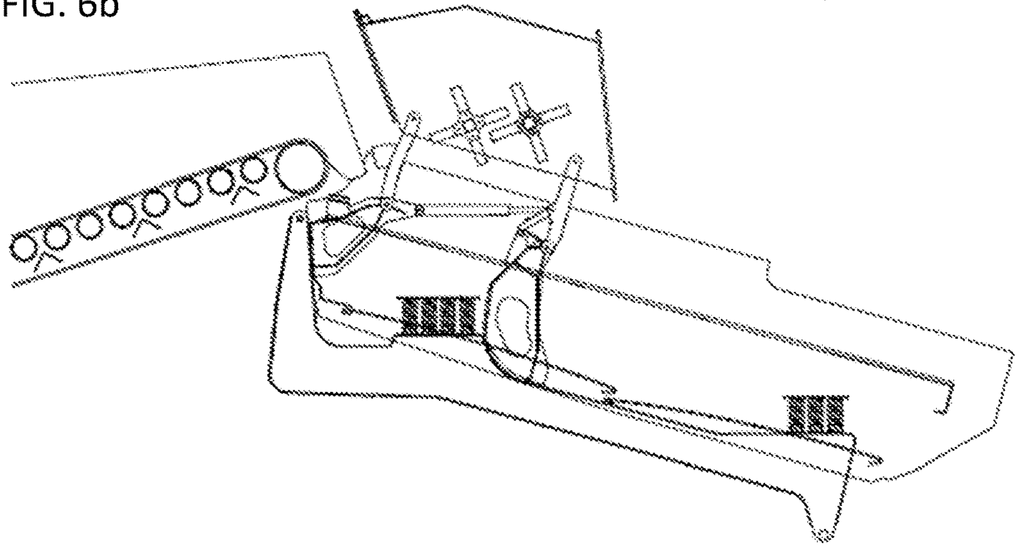
FIG. 6c
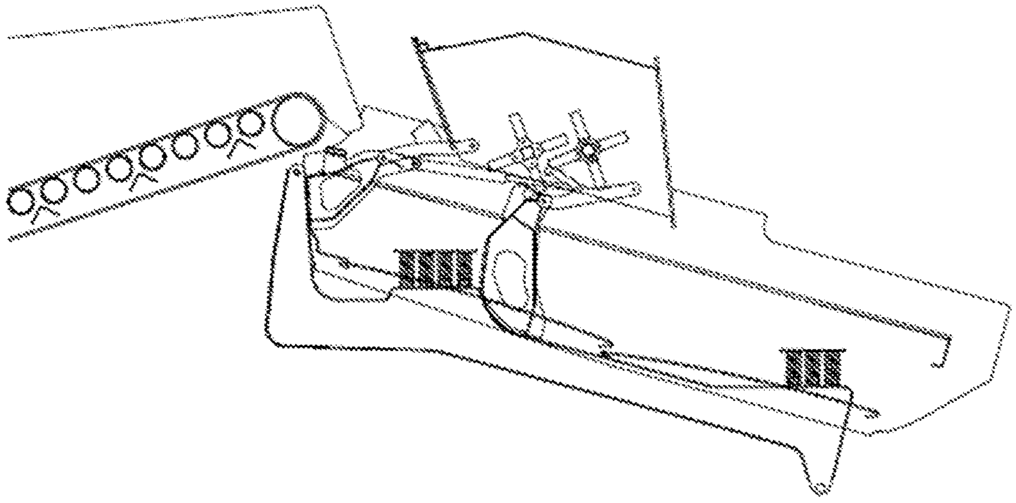

MOBILE AGGREGATE PROCESSING PLANT

FIELD OF THE INVENTION

The present invention relates to mobile aggregate processing plant for separating, unconsolidated feed materials that contain a mixture of particle sizes into two or more streams of different particle sizes. This process is known as screening. The present invention relates to a linkage mechanism for connecting and moving a shredding apparatus to a body of a mobile aggregate processing plant, particularly but not exclusively for transportation purposes.

BACKGROUND

Mobile aggregate processing plants are well known in the art. Typically, a mobile aggregate processing plant generally comprise a feed hopper or the like, a mechanical screen, and two or more discharge conveyors to collect and transfer the processed materials to a nearby location or to a secondary processing plant.

Mechanical screens separate material via, liner, vibratory or rotary movement. This movement agitates and moves the feed material along a screening deck. A mechanical screen comprises a housing and at least one screen deck, upon which is mounted the screen media. The media is the material or apparatus that define the screen's aperture size. Screen can be made from woven wire cloth, steel mesh, perforated steel plate, perforated synthetic mats, finger tines or rotating decks. The material smaller than the apertures falls through the openings, while material greater than the apertures continues to move along the screening surface until it exits the screen.

The separated particles are generally collated and discharged from the plant. The discharge streams can be directed away from the plant by various suitable conveyors, generally being positioned in different directions, into suitable piles or into suitable containers or trucks, etc. Once feed material at one location is screened, the mobile aggregate processing plant can be relocated for processing a new feed of material, typically at or near the same site. The screens may be arranged in a series of levels, such as 'upper deck' and 'lower deck'.

The action of the vibrating screening unit is usually of such 'heavy duty', that regular repair or replacement of the screen therein is required. Replacement of the screens is also sometimes required when the nature of the material fed material changes, or different grades or types of discharge streams are required.

U.S. Pat. No. 11,033,933 B2 discloses a mobile aggregate processing plant for screening material comprising a mobile chassis, a vibrating screening unit mounted on the mobile chassis and able to provide at least one material discharge stream therethrough, and an underscreen conveyor located wholly or substantially beneath the vibrating screening unit to wholly or substantially receive said at least one material discharge stream, wherein the underscreen conveyor is driveable in an uphill direction so as to be able to discharge the material discharge stream at a height higher than receiving the material discharge stream, relative to the mobile chassis.

Feed materials that contain a high moisture content, such as compost and soil, tend to clump together and can be problematic and difficult to screen through the screening apparatus described herein. As a solution, the industry often uses additional apparatus, units, or equipment to break apart clumped material before grading. Such apparatus includes hammermills, flail rotors, augers, or the like, and will be described as a 'shredder' herein.

The use of a shredder to break apart 'clumpy' materials is known in the art. For example, U.S. Pat. No. 7,121,487 B2 discloses a screening machine on a frame with a hopper having a conveyor belt. The conveyor belt discharges particulate material poured into the hopper into a rotating barrel screen or vibrating planar screen for sifting the material. A hammermill apparatus is pivotably mounted on a hood member to an arm that is pivotably mounted to the frame of the machine. The hammermill is positioned above the conveyor belt at the discharge end. The hammermill can pivot upwardly relative to the arm upon striking a large object on the conveyor belt, and a spring mounted to the arm and the hood biases the hammermill back to its original position. A hydraulic ram is drivingly linked to the arm for manually or automatically displacing the hammermill relative to the conveyor belt.

However, there are various 'transport' height restrictions in many countries, such as the UK and Germany, which can restrict the transport of larger mobile aggregate processing plants. There are well known height restrictions on many public roads, railways and other transport paths or links. Thus, being able to lower the overall height of the mobile aggregate processing plant may allow a large mobile aggregate processing plants to meet such transport height restrictions, and/or significantly reduce the requirement for any special permits or conditions. In this way, being able to reduce the overall height of larger sized aggregate processing plant may lead to more convenient transportation of the plant from place to place.

SUMMARY OF THE INVENTION

The present invention details a linkage mechanism to support and move a shredding apparatus as part of a mobile aggregate processing plant. Particularly, though not exclusively, the linkage mechanism allows for the shredding apparatus to be lower into in a transport configuration, as discussed hereinafter. Thus, allowing the mobile aggregate processing plant to be towed on a public highway by a large vehicle, or towed on a suitable trailer.

According to one aspect of the present invention, there is provided a mobile aggregate processing plant for screening material comprising of a chassis, a vibrating screen mounted on a support frame, wherein the vibrating screen has an infeed end or 'inlet end', and a discharge end or 'outlet end', and is able to provide at least one material discharge stream therethrough, and a feed hopper, having a discharge end or 'outlet end' able to feed a stream of feed material into or onto the vibrating screen,-a shredding apparatus located above the infeed end of the vibrating screen next to the hopper discharge end. The shredding apparatus is wholly, substantially, or partly located within the stream of feed material.

The shredding apparatus consists of a rotor on which a series of flail are mounted, a rotor housing attached to one or more support members, and a drive mechanism to rotate the rotor.

A preferred aspect of the invention is that the shredding apparatus is supported by one or more linkage mechanisms connecting one or more support members to the vibrating screen frame.

Optionally the shredding apparatus is supported by one or more linkage mechanisms connecting one or more support members to the mobile chassis.

Another aspect of the invention is that the shredding apparatus is suspended above the screen box allowing the shredding apparatus to spread the feed material eventually across the screen deck when operating, thus improving screening efficiency.

A preferred aspect of the invention is that the linkage mechanism supporting the shredding apparatus is used to move the shredding apparatus relative to the feed hopper, allowing the shredding apparatus to be moved to a working, transport, or inactive position. The supporting structure and the housing surrounding the shredding apparatus moves with the shredding apparatus as a single unit. Wherein one or more hydraulically operated actuators is used to move the shredding apparatus to the desired position.

Optionally the housing surrounding the apparatus may be fixed and does not move. Wherein the shredding apparatus can be moved to the desired position.

Advantageously this enables easy positioning of the shredding apparatus relative to the feed hopper; when preparing the mobile aggregate processing plant for transport, when setting the shredding apparatus up for operation, and when placing the shredding apparatus into an inactive state; i.e., where the shredding apparatus is moved into a position away from the stream of feed material, allowing the mobile aggregate processing plant to operate with the shredding apparatus disengaged.

Advantageously this enables to the easy positioning of the shredding apparatus to a third position to allow for maintenance work such as clearing blockages, replacing damaged components, replacing screen media, etc.

Another aspect of the invention is the use of a safety lock to preventing the accidental operation of the shredding apparatus when the shredding apparatus is in the transport and inactive position.

BRIEF DESCRIPTION OF THE DRAWINGS

The invention will be more clearly understood by the following descriptions of some embodiments thereof, given by way of example only, and with reference to accompanying drawings, in which:

FIG. 4*a* is a perspective view of a shredding apparatus in connection with an embodiment of the present invention;

FIG. 4*b* is a perspective sectional view of a shredding apparatus in connection with an embodiment of the present invention;

FIG. 5*a* is an illustration of an auger type rotor;

FIG. 5*b* is an illustration of a hammermill type rotor;

FIG. 5*c* is an illustration of a flail type rotor;

FIG. 6*a* is an illustration of the shredding apparatus with an embodiment of the present invention in its working position;

FIG. 6*b* is an illustration of the shredding apparatus with an embodiment of the present invention in its deactivated position;

FIG. 6*c* is an illustration of the shredding apparatus with an embodiment of the present invention is its transport position.

DETAILED DESCRIPTION

The present invention details a linkage mechanism to support and move a shredding apparatus as part of a mobile aggregate processing plant.

Figure 1:
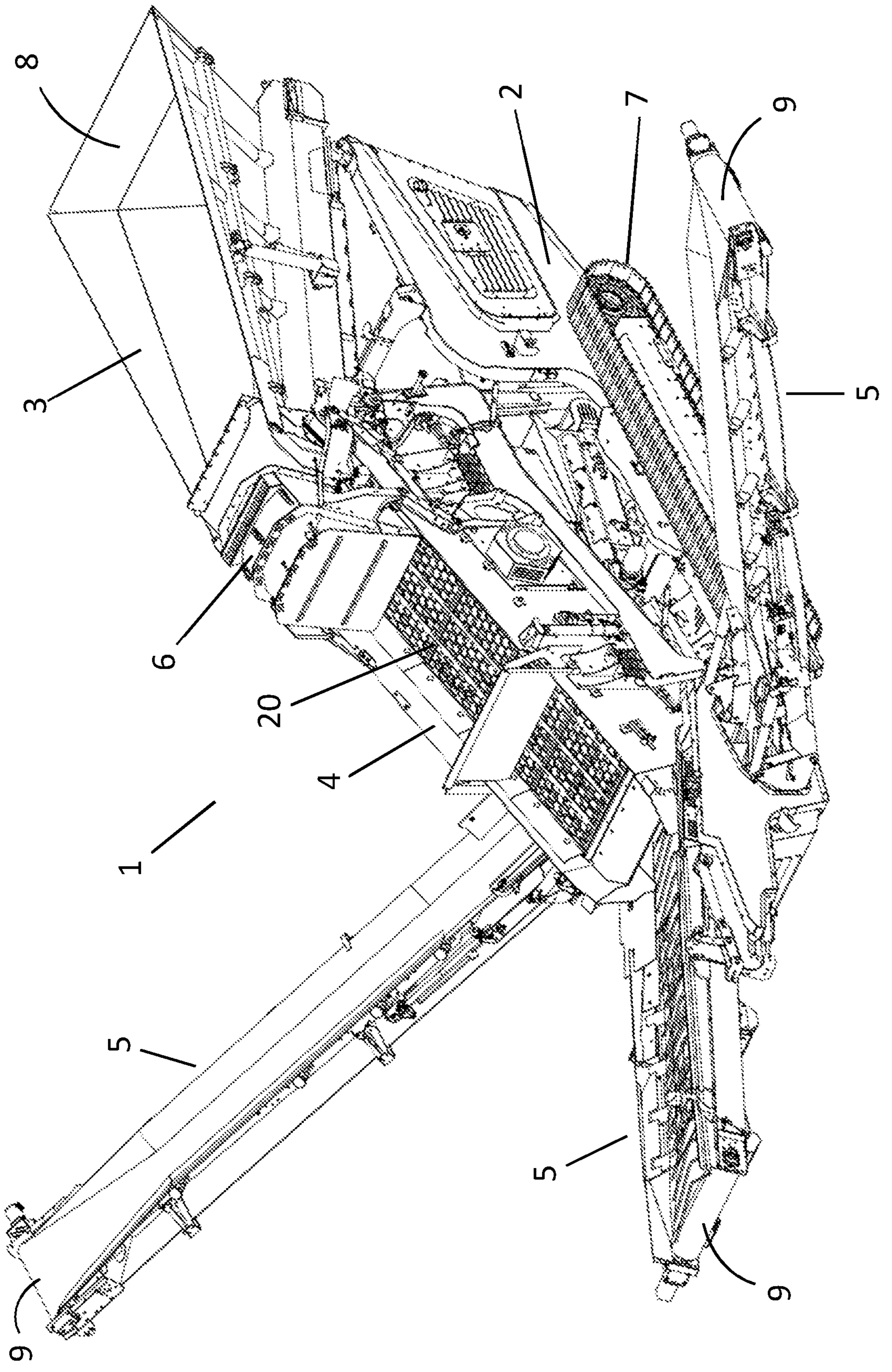
FIG. 1 is a perspective view of a mobile material processing apparatus, specifically, in this embodiment, a mobile processing apparatus with a shredder.

Referring to the drawings, FIG. 1 shows an example of a mobile aggregate processing plant (1) in connection with an embodiment of the present invention. The apparatus (1) comprises a mobile chassis (2), a feed hopper (3), three discharge conveyors (5), a shredding apparatus (6), and a mechanical screen (4); in particular an inclined vibrating mechanical screening unit often referred to as a vibrating screen.

The mobile chassis (2) may be formed of a frame or framework, having an undercarriage, and a plurality of wheels on each side, optionally with a caterpillar-type track (7) or tracking around the wheels in a manner known in the art. The action and ability of caterpillar tracks (7) is well known in the art, and is not further discussed herein.

Optionally the plant may be self-mobile, usually within an area or range, such as within a working area or areas at which it is desired to process material, such as a demolition site or rock-processing site. Such mobility can be provided by a suitable motor on the mobile chassis (2).

Figure 2A:
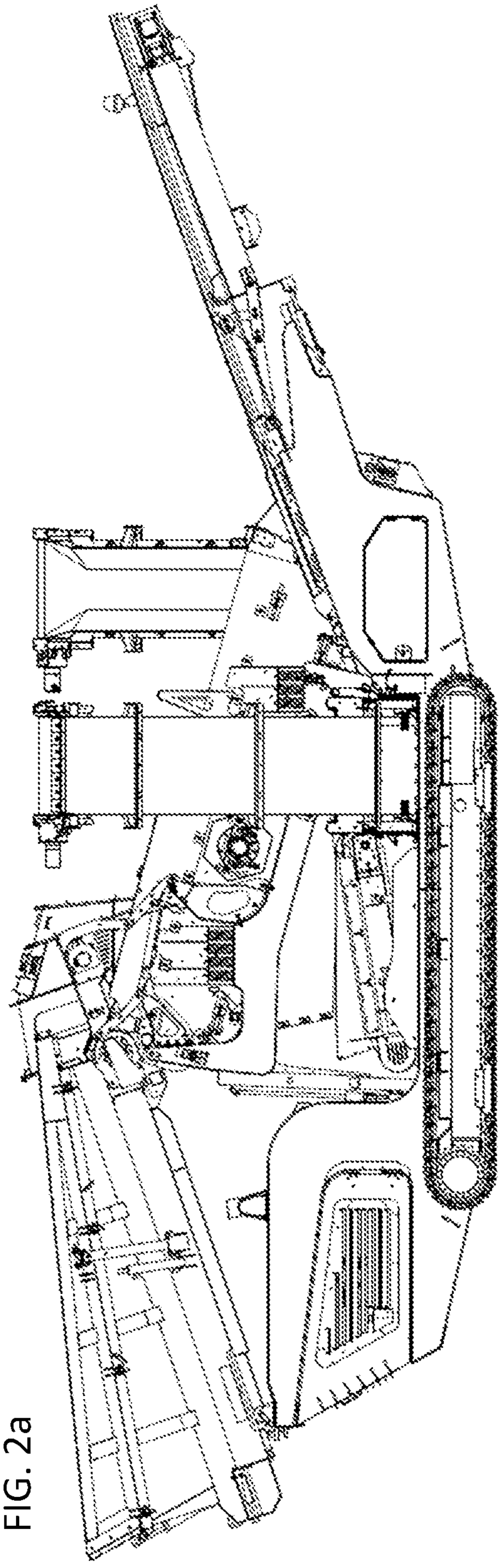
FIG. 2*a* is a side view of the mobile processing apparatus, of FIG. 1, showing the apparatus in its working configuration.
Figure 2B:
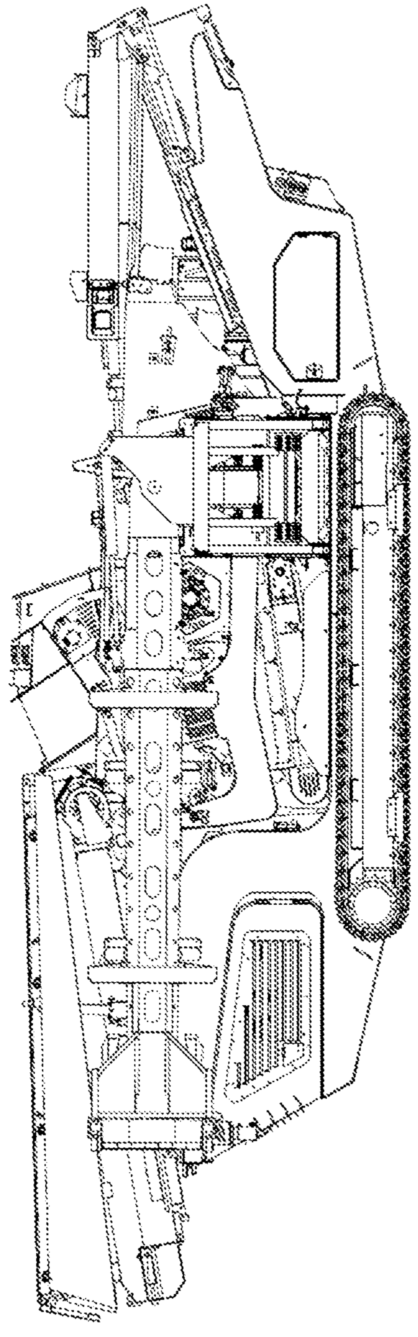
FIG. 2*b* is a side view of the mobile processing apparatus, of FIG. 1, showing the apparatus in its transport configuration.

FIG. 2 shows a comparison of a mobile aggregate processing plant (1) of FIG. 1 in it working and transport configurations. FIG. 2*a* shows the plant in its working configuration. FIG. 2*b* show the plant in its transport configuration.

Mobile aggregate processing plants (1) generally has a feed or input end (8), and a discharge or outlet end or ends (9). The feed end (8) is for input of mixed feed material to be processed, starting with the feed hopper (3). The term 'discharge' is used herein to describe the feed material exiting (14) the feed hopper (3), graded materials exiting the vibrating screen (18,19), or any graded materials exiting the mobile aggregate processing plant (1) via the discharge conveyor(s) (9).

Figure 3:
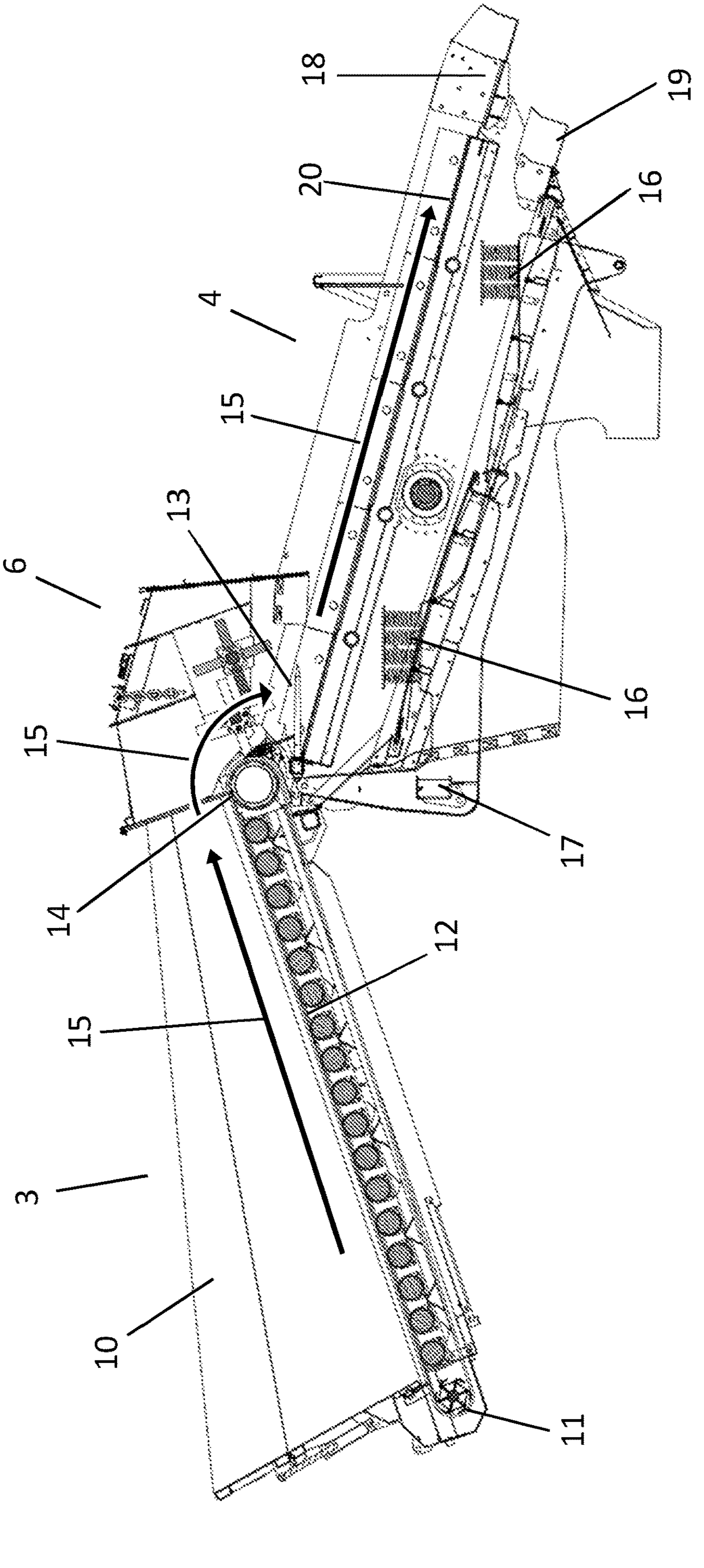
FIG. 3 is a partial section view of the mobile aggregate processing plant shows the stream of material.

FIG. 3 Is a partial section view of the mobile aggregate processing plant (1). FIG. 3 shows the stream of material. The term 'stream' is used herein to describe the direction (15) in which the feed material moves from the feed hopper (3) to the mechanical screen (4).

The feed hopper (3) is designed or configured to receive a supply of feed material. The hopper (10) is typically designed to direct the feed material towards the feed conveyor (11) located at the bottom of the hopper (10), and typically having a conveyor belt (12) or the like, to convey the feed material towards a mechanical screen (4). From the feed hopper (3) the feed material is directed into and/or onto one end (13) of a vibrating screen (4). Optionally, the feed hopper (3) is inclined relative to the chassis (2), typically in an uphill direction towards the mechanical screen (4). Optionally the feed hopper (3) may be ordinated horizontally relative to the chassis (2).

The vibrating screen (4) is typically mounted on a supporting frame (17) by mean of a suspension system (16) that allow reciprocating movement relative to the supporting frame (17). This supporting frame (17) will be described as the vibrating screen frame hereinafter. The vibrating screen (4) is inclined from its upper inlet end (13) receiving the mixed feed material from the feed hopper (3), downwardly towards its discharge or outlet end (18, 19), from where there can be one or more discharges of at least one grade of material. The combination of vibration and angle of incline agitates and moves the feed material along a screening deck (20). As the material flow over the screen deck (20) under-size particles pass through the openings in the screen deck (20) thus separating the undersize particles from the oversize particles. The oversize particles are subsequently discharged from a lower end of the deck (18) onto a stockpile conveyor or into a collection bay or hopper.

Optionally the mechanical screen could be a disc screen, also known as star screen. Disc screen are well known in the art and generally comprise a series of shafts on which rotating star or disc type wheels are mounted. The spacing between the shaft determines the respective openings. Separation is achieved by rotating the shafts simultaneously in the same direction to agitate and convey the material along the screen's surface. The undersized particles fall through the openings, while the oversize particles continue to move along the screening surface until it exits the screen.

The feed material may comprise any mixture, including materials from quarries, building sites, waste processing facilities and composting facilities, including but not limited to feed materials that contain high volumes of damp, bulky and/or non-uniform constituents such as biomass, soil, compost, plastic, textiles, newspaper, and cardboard. Feed materials that contain a high moisture content, such as compost and soil, tend to clump together and can be problematic and difficult to screen.

Additional equipment and apparatus such as, augers; illustrated by FIG. 5*a*. hammermills; illustrated by FIG. 5*b*, flail rotors; illustrated by FIG. 5*c*, and the like are used to break apart clumped material before grading.

Figure 4C:
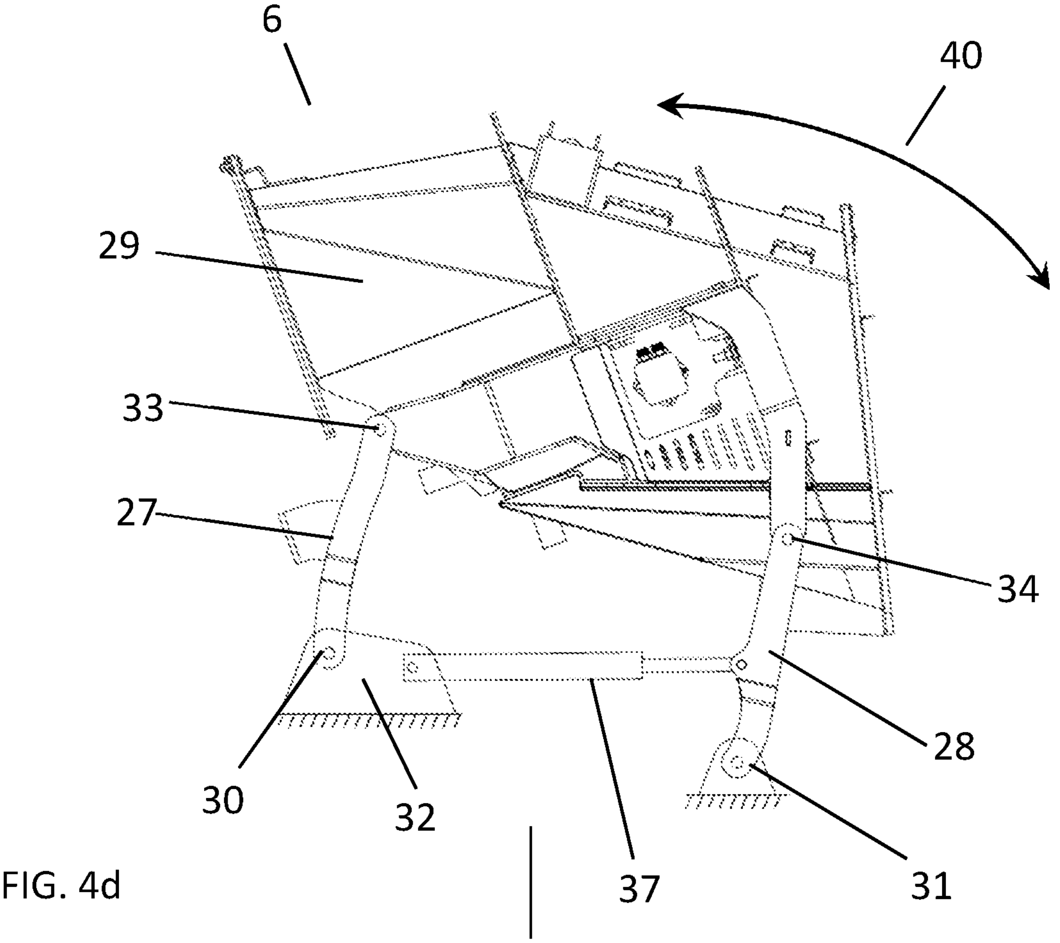
FIG. 4*c* is a side view of a shredding apparatus in connection with an embodiment of the present invention.
Figure 4D:
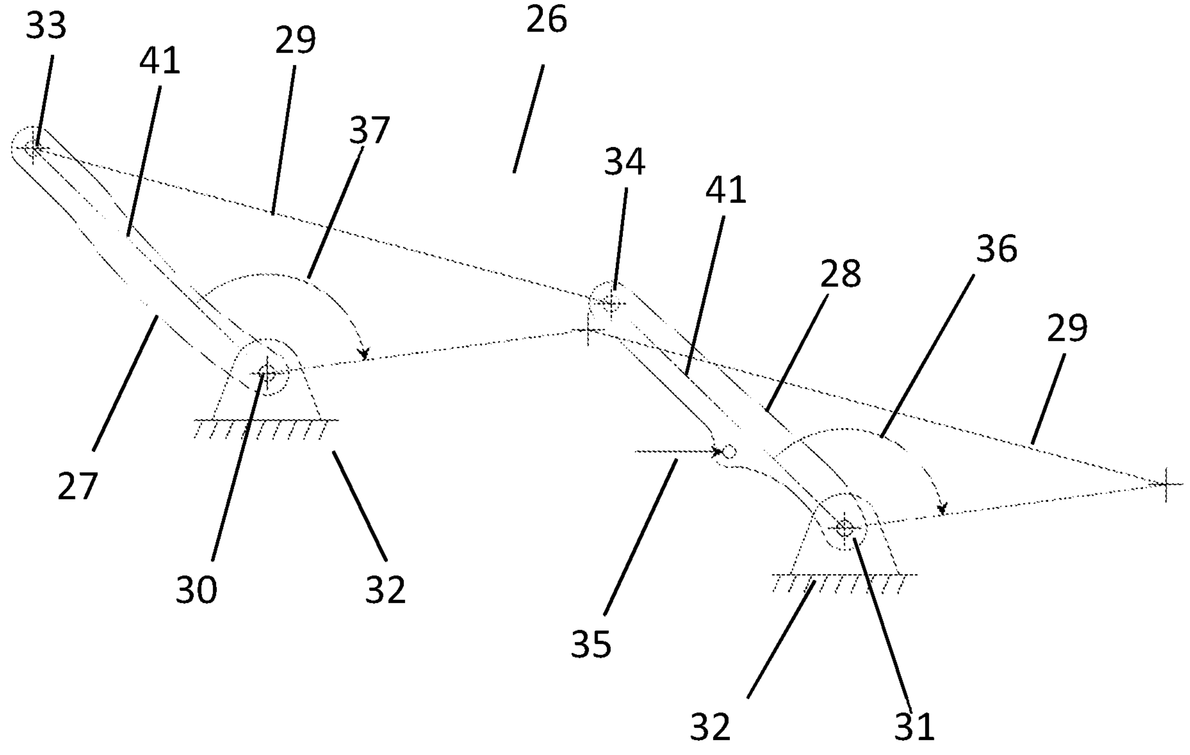
FIG. 4*d* is an illustration of the preferred embodiment of the present invention.

Referring to FIG. 4, The present invention may be used with any of these types of shredding apparatus. In general, the shredder (6) consists of; a series of blades (21), also referred as knives, flails, or hammers; at least one rotating axle (22) within a housing (23) attached to one or more support members (24); and a drive mechanism (25) to rotate the axle(s) (22). The drive mechanism (25) comprises at least one motor. Optionally the drive motor(s) can be electric, pneumatic, or hydraulic; the drive motor(s) can be directly or indirectly connected to the rotating axle(s) (22) via a universal joint(s), rigid coupling(s) chain(s) and sprocket(s), idler wheel(s). or the like.

According to the present invention, the shredder (6) is suspended above the vibrating screen (4) near the feeder hopper discharge end (14). The shredder (6) is wholly, substantially, or partly located within the stream (15) of feed material and operates to break apart clumped feed material prior to the feed material entering (13) the vibrating screen (4).

An uneven flow of material will reduce the screening capacity. Positioning the shredder (6) above the vibrating screen (4) within the feeder hopper (3) discharge stream (15) will allow the rotating blades (21) to evenly distribute the stream of feed material (15) across the screen deck (20), improving the vibrating screen's (4) capacity.

A problem with developing a shredder (6) which is suspended above the vibrating screen (4) is how to incorporate the shredder (6) onto a mobile aggregate processing plant (1) within the dimensional constraints described hereinbefore. To accomplish this, the present invention details a mechanism (26) which is commonly referred to as either a planar four-bar linkage or a parallel linkage. The mechanism (26) is used to support the shredder (6) as it is suspended above the vibrating screen (4).

The mechanism (26) is used to move the shredder (6) to a position suitable for transportation, as illustrated by FIG. 6*c*.

The mechanism (26) used to move the shredder (6) to a position away from the stream (15) of feed material allowing the mobile aggregate processing plant (1) to operate with the shredder (6) disengaged, as illustrated by FIG. 6*b*.

The mechanism (26) is used to move the shredder (6) into a position which is wholly, substantially, or partly located within the stream of feed material (15), as illustrated by FIG. 6*c*.

The mechanism (26) comprises two linkages (27, 28), a moving embodiment (29) represented by the shredder (6), a fixed embodiment (32) represented by the vibrating screen frame (17), at least two fixed pivotal joints (30, 31), and at least two moving pivotal joints (33, 34).

Optionally, the fixed embodiment (32) can be the mobile chassis (2).

Optionally the fixed embodiment (32) can be a separate structural member independent of the mobile chassis (2) and vibrating screen frame (17).

The linkages (27, 28) can be classified as either the input (28) or output (27) linkage. Each linkage (27, 28) is connected to a pivotal joint (33, 34) on the moving embodiment (29, 6) and a pivotal joint (30, 31) on the fixed embodiment (32, 17). A driving force (35) rotates (36) the input linkage (28) about its fixed pivotal joint (31). As the input linkage (28) rotates about its fixed pivotal joint (31) the drive force (35) is transferred through the moving embodiment (29, 17) to the output linkage (27), as a result, the output linkage (27) will rotate (37) simultaneously in the same direction about its fixed pivotal joint (30). The straight lines (41) drawn between pivotal joints will remain parallel as the linkages (27, 28) rotate about their fixed pivotal joints (30, 31).

Optionally, either or both linkages can be straight.

Optionally, either of both linkages can be an irregular or parabolic shape.

At least one linear actuator (37) consisting of a bore end and an extendable piston rod end provides necessary driving force (35) to move the input linkage (28). The linear actuator (37) can be hydraulic, pneumatic, or electric.

Generally, the pivotal joints (30, 31, 33, 34) are configured so the linkages (27, 28) move relative to each other which allow for the moving body (29), i.e., shredder (6) to move in a backwardly and forwardly direction (40). The length of each linkage (27, 28) affects this range of movement (40), which can be configured to suite alternative shredding apparatus described herein, or, larger and smaller mobile aggregate processing plants.

The present invention described herein shows the shredding apparatus (6) supported by two linkages mechanisms (26). Optionally the shredding apparatus (6) can be is supported by at least one linkage mechanism (26).

Another aspect of the invention is the use of an interlock in the form a three-port hydraulic diverter valve redivert the prevent the shredding apparatus from operating when in the transport or inactive position.

The invention claimed is:

1. A mobile aggregate processing plant for screening material comprising:

a chassis and a vibrating screen support frame, a vibrating screen mounted on the support frame, wherein the vibrating screen has an infeed end and a discharge end, and able to provide at least one material discharge stream therethrough, a feed hopper having a discharge end able to feed a stream of feed material directly onto the vibrating screen, and a shredding apparatus comprising a shredding housing, a rotor within the shredding housing on which a series of shredding means are mounted, one or more rotor support members, and a drive mechanism to rotate the rotor, wherein the shredding apparatus is moveable in at least two-dimensions between at least a first in use position above the infeed end of the vibrating screen and/or next to the hopper discharge end, and a second transport position not above the infeed end of the vibrating screen and/or not next to the hopper discharge end.

2. A mobile aggregate processing plant for screening material comprising:

a chassis and support frame, a vibrating screen mounted on the support frame, wherein the vibrating screen has an infeed end and a discharge end, and able to provide at least one material discharge stream therethrough, a feed hopper having a discharge end able to feed a stream of feed material directly onto the vibrating screen, and a shredding apparatus comprising a shredding housing, a rotor within the shredding housing on which a series of shredding means are mounted, one or more rotor support members, and a drive mechanism to rotate the rotor, wherein the shredding apparatus is moveable in at least two-dimensions between at least a first in use position above the infeed end of the vibrating screen and next to the hopper discharge end, and a second transport position, wherein the height of the top of the shredding apparatus above the chassis is greater in the first position than in the second position.

3. A mobile aggregate processing plant as claimed in claim 1 wherein the shredding apparatus is moveable to at least a third position between the first and second positions for permitting maintenance.

4. A mobile aggregate processing plant as claimed in claim 3 wherein the height of the top of the shredding apparatus above the chassis is greater in the third position than in the first position.

5. A mobile aggregate processing plant as claimed in claim 1 wherein the shredding apparatus is supported by one or more linkage mechanisms between the shedding apparatus and remainder of the mobile aggregate processing plant.

6. A mobile aggregate processing plant as claimed in claim 5 wherein the shredding apparatus is supported by one or more linkage mechanisms between the shedding apparatus and the vibrating screen support frame.

7. A mobile aggregate processing plant as claimed in claim 5 wherein the linkage mechanism is moveable to move the shredding apparatus being moveable between the at least a first in use position and the second transport position.

8. A mobile aggregate processing plant as claimed in claim 7 wherein the linkage mechanism is moveable by one or more actuators.

9. A mobile aggregate processing plant as claimed in claim 1 wherein the second position of the shredding apparatus locates the shredding apparatus on the vibrating screen support frame.

10. A mobile aggregate processing plant as claimed in claim 1 wherein the wherein the height of the top of the vibrating screen support frame above the chassis is greater in the first position than in the second position.

11. A mobile aggregate processing plant as claimed in claim 1 wherein the height of the top of the hopper above the chassis is greater in the first position than in the second position.

12. A mobile aggregate processing plant as claimed in claim 1 further comprising at least one discharge stream conveyor.

13. A mobile aggregate processing plant as claimed in claim 12 comprising three discharge stream conveyors.

14. A mobile aggregate processing plant as claimed in claim 12 comprising three discharge stream conveyors arranged outwardly from the mobile aggregate processing plant at different angles relative to the vibrating screen.

15. A mobile aggregate processing plant as claimed in claim 2 wherein the shredding apparatus is moveable to at least a third position between the first and second positions for permitting maintenance.

16. A mobile aggregate processing plant as claimed in claim 15 wherein the height of the top of the shredding apparatus above the chassis is greater in the third position than in the first position.

17. A mobile aggregate processing plant as claimed in claim 2 wherein the shredding apparatus is supported by one or more linkage mechanisms between the shedding apparatus and remainder of the mobile aggregate processing plant.

* * * * *